No. 674,305. Patented May 14, 1901.
R. L. PATTERSON.
CONTAINING VESSEL.
(Application filed Dec. 5, 1900.)
(No Model.)
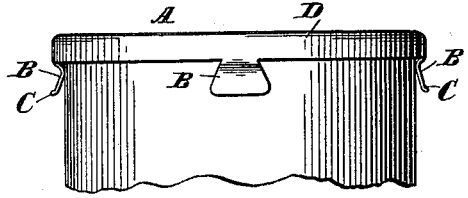
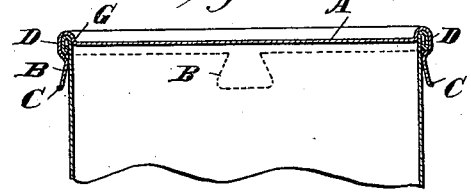
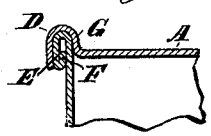
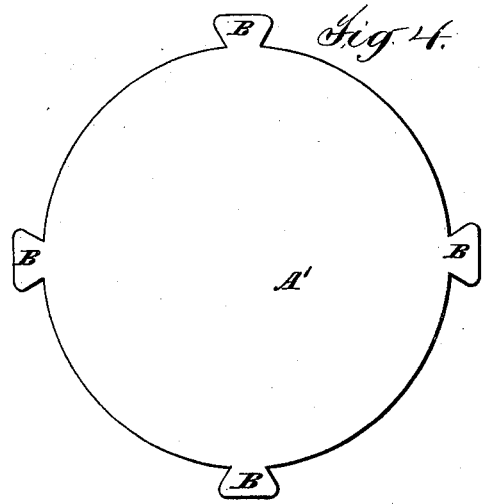
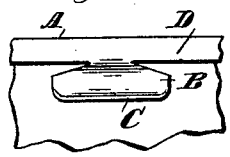
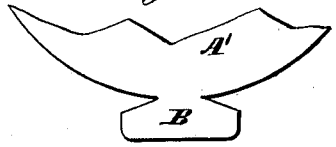
Attest:
T. F. Kehoe
J. V. Bourke
Inventor:
Rufus L. Patterson
by Philipp, Sawyer, Rice & Kennedy
Attys

UNITED STATES PATENT OFFICE.

RUFUS L. PATTERSON, OF NEW YORK, N. Y., ASSIGNOR TO THE AMERICAN TOBACCO COMPANY, OF NEW JERSEY.

CONTAINING VESSEL.

SPECIFICATION forming part of Letters Patent No. 674,305, dated May 14, 1901.

Application filed December 5, 1900. Serial No. 38,770. (No model.)

*To all whom it may concern:*

Be it known that I, RUFUS L. PATTERSON, a citizen of the United States, residing at New York, county of New York, and State of New York, have invented certain new and useful Improvements in Containing Vessels, fully described and represented in the following specification and the accompanying drawings, forming a part of the same.

This invention relates to certain improvements in covers for containing vessels.

Metallic containing vessels—such, for instance, as cans—in which it is desired to make an air-tight joint between the vessel and the cover usually have their covers secured by seaming, the entire edge of the cover being bent underneath a shoulder, such as a beaded edge, formed on the can. While a tight joint can be readily formed in this manner by a suitable seaming machine or tool, a vessel thus sealed cannot be easily opened by bending out the inturned edge, and it is usual to open such vessels by cutting out the whole or a considerable part of the central portion of the cover. This operation not only requires the use of a cutting-tool of some sort, but it also destroys the cover. It is furthermore desirable in many cases to allow the contents of the vessel to remain in it after opening, such contents being used therefrom in small quantities from time to time, and in order to do this the cover should be of such a construction that after the vessel is opened the cover can be replaced thereon and make a fairly tight joint therewith, so as to keep the contents in good condition. If, however, the cover has to be cut off in the manner stated, the vessel becomes practically useless as a container.

It is one of the objects of this invention to produce a cover more especially for metallic containing vessels, although it may be used with vessels made from other materials, which shall be cheap and simple in construction, which shall be capable of being applied to a containing vessel so as to make a tight joint therewith, and which may be readily removed without the use of a tool and without destroying the usefulness of the cover.

A further object of the invention is to produce an improved form of containing vessel which shall be so constructed that the cover may be readily secured thereto in order to make an air-tight joint therewith and upon which the cover will fit tightly after the air-tight joint is broken.

With these and other objects in view the invention consists in certain constructions and in certain parts, improvements, and combinations, as will be hereinafter described and then more particularly pointed out in the claims hereunto appended.

In the accompanying drawings, which form a part of this specification, and in which like characters of reference indicate the same parts, Figure 1 is a side elevation of the top of an improved containing vessel, showing the cover in place thereon. Fig. 2 is a sectional elevation of the construction shown in Fig. 1. Fig. 3 is a detail sectional view illustrating the manner of forming the bead or shoulder on the top of the vessel and showing the joint between this bead and the cover. Fig. 4 is a plan view of the blank from which the cover is formed. Fig. 5 is a side elevation of a portion of the vessel, showing a modification. Fig. 6 is a plan view of a portion of the blank from which the modified form of cover shown in Fig. 5 is made.

Referring to the drawings, A indicates a cover, said cover being formed from the blank shown in Fig. 4, which is marked A'. The blank and the cover have projecting tongues B, said tongues in the completed cover being bent downwardly and extending from the flange D of the cover, as shown in Figs. 1 and 2. As shown, these tongues B are preferably integrally connected to the flange of the cover, although they might be formed separate from the cover and secured thereto, if desired. The lower ends of the tongues are preferably bent outward at C, as shown in Figs. 1 and 2, to form finger-holds. The tongues B will be formed of metal and will be "flexible," this term being used to distinguish from tongues which are elastic and which are intended, therefore, to spring into place under the shoulder or beaded edge of the vessel.

The cover provided with the flexible tongues is designed to be held in place on the containing vessel, preferably after a vacuum has been established in the vessel, by forcibly bending the tongues under a shoulder or projection on the top edge of the vessel. While the tongues may be bent in any suitable manner, this will preferably be accomplished by subjecting the cover when in place on the vessel to the action of a seaming-tool, which will force the metal of the tongues under the shoulder of the vessel, thus locking the cover firmly in position.

When a cover having flexible tongues of the same strength throughout is employed, the cover being secured to the vessel by seaming or otherwise forcing the metal of the tongues beneath the shoulder of the vessel, it has been found that when the tongues are forced outward and upward in order to remove the cover from the vessel they are liable to bend along a line coincident with the crease produced by the seaming-tool and do not readily pass out of engagement with the shoulder of the vessel. While, therefore, the tongues D may be of any suitable or desired form and may be of the same strength throughout their entire extent, they will preferably be weakened on a line extending across them from side to side, so as to insure their bending at the proper point when the vessel is opened. While this line of weakness may be located at any desired point, the construction will preferably be such that the line of weakness will be coincident with the line of juncture between each tongue and the flange D of the cover. While, furthermore, this line of weakness may be established in any suitable manner, it will preferably be formed by narrowing the tongue where the line of weakness is to occur. In the preferred form of the construction the tongues will be generally frusto-conical in shape, as indicated in Figs. 1 to 4, inclusive, each tongue being narrowest at the point where it joins the flange of the cover.

In securing a cover having weakened flanges to the vessel the seaming-tool or other means for bending the metal of the tongues beneath the shoulder of the vessel will preferably be arranged to crease the tongues on a line which is slightly below the line of weakness before referred to. When the weakened tongues thus secured are forced outward and upward to release the cover of the vessel, they will bend above the crease produced by the seaming-tool and will be easily forced out of engagement with the shoulder of the vessel.

While the tongues, as before stated, will be preferably frusto-conical in shape, the narrowest part of each tongue coinciding with its line of juncture with the flange of the cover, they may be otherwise shaped, and a tongue of somewhat different shape is indicated in Figs. 5 and 6, although in this construction the line of weakness is located as before—that is, it coincides with the line of juncture between the tongue and the flange of the cover.

The cover of the vessel will preferably be formed with a depressed center, as shown at G of the several figures; but the cover may have a flat top, if desired.

While the shoulder on the vessel may be formed in any suitable or desired manner, it will preferably be made by bending the metal of the vessel downward, as shown, to form an outer wall, as at E, and then upward, as at F, the outer wall being then flattened, so as to present a surface which is substantially parallel with the inner wall of the flange of the cover. Preferably, furthermore, the flange of the cover and the outer wall of the shoulder or bead will be substantially the same length. By thus flattening the outer wall of the shoulder of the vessel a surface of considerable extent is provided, which is engaged by the inner surface of the flange of the cover. This construction insures a tight fit between the flange of the cover and the shoulder on the vessel, and as the engaging surfaces of the flange and shoulder are of considerable extent a tight joint between them is more readily formed and maintained.

Covers having flexible tongues formed as described are particularly adapted for use with vessels which are to be sealed *in vacuo*. The construction readily lends itself to the formation of an air-tight joint, so that the contents of the vessel may be hermetically sealed, and at the same time by bending the tongues outward the cover can be readily removed, notwithstanding the vacuum which exists in the vessel.

While the constructions shown in the drawings illustrate the invention in its preferred forms, it is to be understood that the invention is not confined to these constructions. Thus, for instance, the invention is applicable not only to circular vessels, such as shown, but to rectangular vessels. Furthermore, while covers having weakened tongues, the lines of weakness being located as shown, are preferably employed the invention extends to covers having tongues which are not weakened and to covers having tongues in which the lines of weakness are located otherwise than as shown.

What is claimed is—

1. The combination with a metallic containing vessel having a shoulder which is substantially parallel to the wall of the vessel, of a cover having a flexible securing-tongue which is adapted to be seamed between its ends beneath the shoulder of the vessel, said tongue having an outwardly-turned end to form a finger-hold, substantially as described.

2. The combination with a containing vessel having a shoulder, of a cover having a securing-tongue connected thereto, the tongue being weakened so as to insure the bending of the tongue at the line of weakness and being adapted to be seamed between its ends beneath the shoulder of the vessel so as to provide an extension beyond the line of seaming, substantially as described.

3. The combination with a containing vessel having a shoulder, of a cover having a flexible weakened tongue which is adapted to be seamed between its ends beneath the shoulder of the vessel so as to provide an extension beyond the line of seaming, substantially as described.

4. The combination with a containing vessel having a shoulder, of a cover having a securing-tongue connected thereto, the tongue being weakened at the line of juncture with the cover, and being adapted to be seamed between its ends beneath the shoulder of the vessel so as to provide an extension beyond the line of seaming, substantially as described.

5. The combination with a containing vessel having a shoulder, of a cover having a securing-tongue connected thereto, the tongue having a line of weakness which is substantially coincident with the line of juncture between the cover and the tongue, said tongue being adapted to be seamed between its ends beneath the shoulder of the vessel and having an outwardly-turned end to form a finger-hold, substantially as described.

6. The combination with a containing vessel having a shoulder, of a cover having a flexible securing-tongue connected thereto, the tongue being weakened at the line of juncture with the cover, and being adapted to be seamed between its ends beneath the shoulder of the vessel so as to provide an extension beyond the line of seaming, substantially as described.

7. The combination with a containing vessel having a shoulder, of a cover having a flexible securing-tongue connected thereto, the tongue having a line of weakness which is substantially coincident with the line of juncture between the cover and the tongue, said tongue being adapted to be seamed between its ends beneath the shoulder of the vessel and having an outwardly-turned end to form a finger-hold, substantially as described.

8. The combination with a containing vessel having a shoulder, of a cover having a securing-tongue connected thereto, the tongue being narrowed at its line of juncture with the body of the cover, said tongue being adapted to be seamed between its ends beneath the shoulder of the containing vessel, substantially as described.

9. The combination with a containing vessel having a shoulder, of a cover having a downwardly-projecting tongue connected thereto, the tongue being narrowed at its line of juncture with the cover, said tongue being adapted to be seamed between its ends beneath the shoulder of the containing vessel and having its end turned outwardly to form a finger-hold, substantially as described.

10. The combination with a containing vessel having a shoulder, of a cover provided with flexible securing-tongues adapted to be seamed between their ends beneath the shoulder, said tongues being weakened between the cover and the line of seaming, substantially as described.

11. The combination with a metallic containing vessel having its edge turned downward and then upward to form a shoulder, the outer wall of said shoulder being flattened, of a flanged cover engaging the flattened wall of the shoulder and having flexible tongues or projections which are adapted to be bent beneath the shoulder, substantially as described.

12. The combination with a metallic containing vessel having its edge turned downward and then upward to form a shoulder, the outer wall of said shoulder being flattened, of a cover having flexible weakened tongues or projections which are adapted to be bent beneath the shoulder, substantially as described.

13. The combination with a metallic containing vessel having its edge turned downward and then upward to form a shoulder, the outer wall of said shoulder being flattened, of a cover having a flange which extends substantially to the lower edge of the shoulder, said flange having flexible projections which are adapted to be bent beneath the shoulder, substantially as described.

14. The combination with a metallic containing vessel having its edge turned downward and then upward to form a shoulder, the outer wall of said shoulder being flattened, of a cover having a flange which extends substantially to the lower edge of the shoulder, said flange being provided with projections, the connection between the projections and the flange being weakened, substantially as described.

15. The combination with a metallic containing vessel having its edge turned downward and then upward to form a shoulder, the outer wall of said shoulder being flattened, of a cover having a flange which extends substantially to the lower edge of the shoulder, said flange having tongues projecting therefrom which are narrowed at their line of juncture with the flange, substantially as described.

16. The combination with a metallic containing vessel having its edge turned downward and then upward to form a shoulder, the outer wall of said shoulder being flattened, of a cover having a flange which extends substantially to the lower edge of the shoulder, said flange having tongues projecting therefrom which are narrowed at their line of juncture with the flange, and the ends of the tongues being bent outward to form finger-holds, substantially as described.

17. The combination with a metallic containing vessel having its edge turned downward and then upward to form a shoulder, the outer wall of said shoulder being flattened, of a cover having a depressed center and a flange which extends substantially to the lower edge of the shoulder, said flange having tongues projecting therefrom which are narrowed at their line of juncture with the flange, and the ends of the tongues being bent outward to form finger-holds, substantially as described.

In testimony whereof I have hereunto set my hand in the presence of two subscribing witnesses.

RUFUS L. PATTERSON.

Witnesses:
  J. LAWSON HARDIN,
  GEO. M. GALES.